United States Patent
Lee et al.

(10) Patent No.: US 10,414,840 B2
(45) Date of Patent: *Sep. 17, 2019

(54) CURABLE COMPOSITION FOR GLASS SUBSTITUTE

(71) Applicant: LG CHEM, LTD., Seoul (KR)

(72) Inventors: Han Na Lee, Daejeon (KR); Heon Kim, Daejeon (KR); Yeong Rae Chang, Daejeon (KR); Soon Hwa Jung, Daejeon (KR); Jin Seok Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/511,591

(22) PCT Filed: Sep. 16, 2015

(86) PCT No.: PCT/KR2015/009735
§ 371 (c)(1),
(2) Date: Mar. 15, 2017

(87) PCT Pub. No.: WO2016/043525
PCT Pub. Date: Mar. 24, 2016

(65) Prior Publication Data
US 2017/0283527 A1    Oct. 5, 2017

(30) Foreign Application Priority Data

Sep. 18, 2014   (KR) .................. 10-2014-0124474
Sep. 15, 2015   (KR) .................. 10-2015-0130565

(51) Int. Cl.
*C08F 22/20*  (2006.01)
*C09D 135/02* (2006.01)
*C09D 4/00*   (2006.01)

(52) U.S. Cl.
CPC ............... *C08F 22/20* (2013.01); *C09D 4/00* (2013.01); *C09D 135/02* (2013.01)

(58) Field of Classification Search
CPC .......... C08F 22/20; C08F 2/50; C09D 135/02; C09D 4/00
See application file for complete search history.

(56) References Cited

U.S. PATENT DOCUMENTS

| | | |
|---|---|---|
| 2001/0034379 A1 | 10/2001 | Valet |
| 2006/0020051 A1 | 1/2006 | Ito et al. |
| 2006/0235101 A1 | 10/2006 | Messe |
| 2010/0216912 A1 | 8/2010 | Oka |
| 2010/0249341 A1 | 9/2010 | Sato et al. |
| 2010/0304100 A1 | 12/2010 | Fong |
| 2011/0200918 A1* | 8/2011 | Mizuta .............. G03H 1/02 430/2 |
| 2013/0034805 A1* | 2/2013 | Hayashida .......... G03F 7/001 430/2 |
| 2013/0302551 A1 | 11/2013 | Kim et al. |
| 2014/0070149 A1 | 3/2014 | Valeri |
| 2015/0086907 A1 | 3/2015 | Mizuta et al. |
| 2015/0232620 A1 | 8/2015 | Sakane |

FOREIGN PATENT DOCUMENTS

| | | | |
|---|---|---|---|
| CN | 101522749 | 9/2009 | |
| JP | 2004204228 A | 7/2004 | |
| JP | 2005528513 A | 9/2005 | |
| JP | 2011509313 A | 3/2011 | |
| JP | 2013242338 A | 12/2013 | |
| KR | 1020000022560 A | 4/2000 | |
| KR | 1020060053915 A | 5/2006 | |
| KR | 1020090028815 A | 3/2009 | |
| KR | 1020100026013 A | 3/2010 | |
| KR | 1020100041992 A | 4/2010 | |
| KR | 101031272 B1 | 4/2011 | |
| KR | 1020120117481 A | 10/2012 | |
| KR | 1020130000390 A | 1/2013 | |
| KR | 1020130049154 A | 5/2013 | |
| KR | 1020130105525 A | 9/2013 | |
| KR | 1020140031244 A | 3/2014 | |
| KR | 1020140051146 A | 4/2014 | |
| KR | 101394835 B1 | 5/2014 | |
| WO | WO 2013/161524 | * 10/2013 | .............. G03H 1/02 |
| WO | 2014061648 | 9/2016 | |

* cited by examiner

*Primary Examiner* — Jessica M Roswell
(74) *Attorney, Agent, or Firm* — Dentons US LLP

(57) ABSTRACT

The present invention relates to a curable composition for a glass substitute. By using a curable composition, excellent wear resistance and high hardness at a glass level can be obtained, and two-dimensional planar plastic film and three-dimensional plastic film without cracks or curls can be provided. The plastic films can be a substitute for existing glass, thereby enabling manufacturing of various electronic products, such as a display and the like, which are light and will not be easily damaged by external pressure.

8 Claims, No Drawings

CURABLE COMPOSITION FOR GLASS SUBSTITUTE

CROSS REFERENCE TO RELATED APPLICATION(S)

This application is a National Stage Application of International Application No. PCT/KR2015/009735, filed Sep. 16, 2015, and claims the benefit of Korean Patent Application No. 10-2015-0130565, filed Sep. 15, 2015, and Korean Patent Application No. 10-2014-0124474, filed Sep. 18, 2014, the contents of which are incorporated herein by reference in their entirety for all purposes as if fully set forth below.

The present invention relates to a curable composition that can be used instead of glass.

TECHNICAL FIELD

Background

With the recent development of mobile devices such as a smart phone and a tablet PC, slimming and thinning of a substrate for a display are required. On the display window or front plate of such a mobile device, glass or tempered glass are generally used as material having excellent mechanical properties. However, glass causes heavy weight of a mobile device due to its own weight, and has a problem of damage by external impact.

Thus, plastic resin is being studied as material that can be used instead of glass. A plastic resin film is light-weighted and has little concern about damage, and thus, is suitable for a tendency to pursue lighter mobile devices. Particularly, in order to achieve a film having high hardness and abrasion resistance, a film in which a hard coating layer consisting of plastic resin is coated on a substrate is being suggested.

As a method for improving the surface hardness of the hard coating layer, increasing the thickness of the hard coating layer may be considered. In order to secure surface hardness to such a level that can be used instead of glass, it is necessary to realize a certain thickness of the hard coating layer. However, as the thickness of the hard coating layer is increased, although surface hardness may increase, wrinkles or curls may be increased due to cure shrink of the hard coating layer, and simultaneously, crack or peel of the hard coating layer may be easily generated, and thus, it is not easy to practically apply.

Patent Document 1 discloses a plastic film using binder resin comprising UV curable polyurethane acrylate-based oligomer without monomers. However, the disclosed plastic film has pencil hardness of about 3H, which is not sufficient for replacing a glass panel of a display.

Meanwhile, a display device in which a part of the edge is curved for esthetic, functional reasons, or a display having a generally curved three-dimensional shape is recently receiving attention, and such a tendency is remarkable particularly in mobile devices such as a smart phone, a table PC. However, in case glass is used as a cover plate for protecting such as display of a three-dimensional shape, there is a high risk of damage due to the heavy weight and vulnerability to external impact of glass.

Although a plastic resin film is light-weighed and has less concern about damage than glass, it is not easy to prepare a film having a three-dimensional structure and exhibiting high hardness like glass.

PRIOR ART

Korean Laid-Open Patent Publication No. 10-2010-0041992 (publication date: 2010 Apr. 23)

DISCLOSURE

Technical Problem

It is an object of the present invention to provide a curable composition that can be used instead of glass.

Technical Solution

According to one embodiment of the invention, a curable composition used instead of glass comprising a cationically curable compound; a radically curable compound; a cationic polymerization initiator comprising a cation of the following Chemical Formula 1; and a radical polymerization initiator, wherein 3,4,3',4'-diepoxybicyclohexyl is included in the amount of 60 wt % to 100 wt % based on the total weight of the cationically curable compound, is provided.

$$R^1\text{-}A^1\text{+}R^2]_k \qquad \text{[Chemical Formula 1]}$$

in the Chemical Formula 1, $A^1$ is N, P or S, $R^1$ is a C1-20 alkyl or a C2-20 alkenyl radical, $R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —CO— k is 2 or 3.

The cationically curable compound may be included in the amount of 30 to 90 parts by weight, based on 100 parts by weight of the curable composition.

In the Chemical Formula 1, $R^1$ may be methyl, ethyl, propyl or allyl, and $R^2$ may be phenyl, naphthyl, benzyl, hydroxyphenyl, acetylphenyl, acetyloxyphenyl, methylbenzyl, or naphthyl methyl.

The cationic polymerization initiator may comprise an anion selected from the group consisting of $PF_6$, $SbF_6$ and $B(C_6F_5)_4$.

The cationic polymerization initiator may be included in the amount of 0.01 to 5 parts by weight, based on 100 parts by weight of the curable composition.

The radically curable compound may be multifunctional acrylate. Specifically, the multifunctional acrylate may include one or more selected from the group consisting of hexanediol diacrylate, hexanediol dimethacrylate, tripropyleneglycol diacrylate, tripropyleneglycol dimethacrylate, ethyleneglycol diacrylate, ethyleneglycol dimethacrylate, trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate.

The radically curable compound may be included in the amount of 5 to 60 parts by weight, based on 100 parts by weight of the curable composition. And, the radical polymerization initiator may be included in the amount of 0.01 to 5 parts by weight, based on 100 parts by weight of the curable composition.

The cationically curable compound and the radically curable compound may be included in the weight ratio of 9:1 to 1:9.

The curable composition may further comprise one or more additives selected from the group consisting of inorganic particles, an antioxidant, an organic solvent, a UV absorber, s surfactant, a leveling agent, and an antifouling agent.

If a coating layer is formed by coating the curable composition on a substrate to the thickness of 100 μm after curing, irradiating UV of 200 mJ/cm² to photocure, and thermally curing at a temperature of 100 to 130° C., it may exhibit pencil hardness of 4H or more under a load of 1.0 kg. And, the coating layer may exhibit haze of 1% or less.

Advantageous Effects

Using the curable composition according to one embodiment of the present invention, a plastic film of a two dimensional flat shape and a plastic film of a three dimensional shape can be provided without generating cracks or curls while realizing high hardness and excellent abrasion resistance of glass level. The plastic film is expected to be used instead of the existing glass and provide various electronic products such as displays, and so on, which are light and have no concern about damage by external pressure.

DETAILED DESCRIPTION OF THE EMBODIMENTS

Hereinafter, a curable composition used instead of glass according to specific embodiments of the invention will be explained.

As used herein, the term "curable composition" means a compound that can be polymerized, cross linked or cured by heat and/or light, and unless otherwise indicated or separately modified, it is intended to include both a photo curable compound and a thermally curable compound. And, as used herein, "polymerization, cross-linking or curing" means that curable compounds are bonded by various chemical reactions to form polymer with higher molecular weight, and polymerization, cross-linking or curing may be used as the same meaning.

According to one embodiment of the invention, a curable composition used instead of glass comprising a cationically curable compound; a radically curable compound; a cationic polymerization initiator comprising a cation of the following Chemical Formula 1; and a radical polymerization initiator, wherein 3,4,3',4'-diepoxybicyclohexyl is included in the amount of 60 wt % to 100 wt % based on the total weight of the cationically curable compound, is provided.

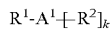 [Chemical Formula 1]

in the Chemical Formula 1,
A¹ is N, P or S,
R¹ is a C1-20 alkyl or a C2-20 alkenyl radical,
R² is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—
k is 2 or 3.

Unless otherwise limited, the following terms are defined as follows.

Halogen may be fluorine (F), chlorine (Cl), bromine (Br) or iodine (I).

A C1-20 alkyl may be linear, branched or cyclic alkyl. Specifically, the C1-20 alkyl may be C1-20 linear alkyl; C1-10 linear alkyl; C1-5 linear alkyl; C3-20 branched or cyclic alkyl; C3-15 branched or cyclic alkyl; or C3-10 branched or cyclic alkyl. More specifically, the C1-20 alkyl may be methyl, ethyl, n-propyl, iso-propyl, n-butyl, iso-butyl, tert-butyl, n-pentyl, iso-pentyl, or cyclohexyl group, and so on.

A C2-20 alkenyl may be linear, branched or cyclic alkenyl. Specifically, the C2-20 alkenyl may be C2-20 linear alkenyl, C2-10 linear alkenyl, C2-5 linear alkenyl, C3-20 branched alkenyl, C3-15 branched alkenyl, C3-10 branched alkenyl, C5-20 cyclic alkenyl or C5-10 cyclic alkenyl. More specifically, the C2-20 alkenyl may be ethenyl, propenyl, butenyl, pentenyl or cyclohexenyl, and so on.

A C6-30 aryl means monocyclic, bicyclic or tricyclic aromatic hydrocarbon. Specifically, the C6-30 aryl may be phenyl, naphthyl or anthracenyl group, and so on.

A C7-35 alkylaryl means aryl of which at least one hydrogen is substituted with alkyl. Specifically, the C7-35 alkylaryl may be methylphenyl, ethylphenyl, n-propylphenyl, iso-propylphenyl, n-butylphenyl, iso-butylphenyl, tert-butylphenyl or cyclohexylphenyl, and so on.

A C7-35 arylalkyl means alkyl of which at least on hydrogen is substituted with aryl. Specifically, the C7-35 arylalkyl may be benzyl, phenylpropyl, or phenylhexyl, and so on.

Glass is transparent and has excellent mechanical properties, and thus, is mainly used in a display, and so on. However, since glass is heavy and easily broken by external impact, it does not satisfy customer requirement for light and thin displays.

Thus, there are continued attempts to realize transparency and hardness of glass with a plastic film that is light-weighted and has little concern about damage. However, a plastic film should have low tackness, high elongation and appropriate tensile properties, and so on, so that it can be cured and molded under severe conditions. Unless such properties are not fulfilled, a plastic film may be broken during a curing and molding processes due to cure shrinkage, or cracks may be generated in a plastic film during a molding process, or a plastic film may be adhered to a mold, and so on, and thus, cannot be molded into a desired shape. Moreover, if a plastic film fulfils all the properties required in curing and molding, it is not easy to exhibit high hardness after curing.

However, the present inventors found out that by using a cationically curable compound and a radically curable compound together, adopting a specific epoxy compound as the cationically curable compound, and adopting a cationic polymerization initiator of a specific structure that initiates cationic polymerization by heat, a curable composition capable of providing a plastic film that has little concern about generation of curl or crack due to excellent processibility and realizes high transparency and high hardness of glass, can be provided, and completed the present invention. And the curable composition can provide a plastic film which is partly or wholly curved, due to excellent processibility. Thus, using the curable composition, it is expected to provide a display of a curved shape that could not be obtained through the existing glass.

Specifically, since the curable composition according to the above embodiment comprises a cationically curable compound, a radically curable compound, a cationic polymerization initiator that generates acid by heat, and a radical polymerization initiator, a plastic film of a desired shape can be obtained by photo-curing a part of the curable composition to obtain a semi-cured product, and after or during molding it to a desired shape, thermally curing remaining curable functional groups.

The curable composition comprises 3,4,3',4'-diepoxybicyclohexyl as a cationically curable compound. The 3,4,3', 4'-diepoxybicyclohexyl can secure a certain distance between the molecules even after curing, by the bicyclohexyl group inside the molecule. Thus, cure shrinkage that can be generated when curing a radically curable compound may be compensated to prevent generation of curl in the plastic film. And, 3,4,3',4'-diepoxybicyclohexyl can form a coating layer that has a fast curing speed and high cross-linking density. As the result, the curable composition can provide a plastic film with high hardness of glass level without degradation of appearance property due to uncured components.

The 3,4,3',4'-diepoxybicyclohexyl may be included in the content of 60 wt % to 100 wt %, 70 wt % to 100 wt %, 80 wt % to 100 wt %, or 90 wt % to 100 wt %, based on total weight of the cationically curable compound included in the curable composition. If the content of 3,4,3',4'-diepoxybicyclohexyl is less than the above range, when preparing a plastic film of a curved shape, hardness may be lowered and thermoformability may be degraded.

The curable composition may further comprise an epoxy compound other than 3,4,3'4'-diepoxybicyclohexyl as a cationically curable compound within a range that does not damage high transparency, high hardness and excellent processibility. As non-limiting example, as another epoxy compound, a compound having one or more epoxy groups in the molecule may be further included. Specifically, other epoxy compound may be an aromatic, an alicyclic or an aliphatic compound having one or more epoxy groups in the molecule. Preferably, an aliphatic compound may be used as other epoxy compound, wherein the aliphatic compound may comprise one or two or more rings, and two or more rings may be simply linked with each other or linked by other linking group or linked in a fused form while sharing one or more carbon atoms. The kind of the aliphatic compound is not specifically limited, and it may be a compound having 3 to 90 carbon number.

The cationically curable compound may be included in the content of 30 to 90 parts by weight, 40 to 90 parts by weight, 50 to 90 parts by weight or 50 to 80 parts by weight, based on 100 parts by weight of the curable composition. The cationically curable compound can provide a plastic film that not only realizes high hardness of glass level and but also exhibits excellent thermoformability, and so on, and thus, can be used instead of glass.

Meanwhile, the curable composition according to one embodiment comprises a cationic polymerization initiator comprising a cation of the Chemical Formula 1.

The cation of the Chemical Formula 1 comprises a group selected from C1-20 alkyl and C1-20 alkenyl ($R^1$ in the Chemical Formula 1), and thus, can easily generate acid by heat. The cation of the Chemical Formula 1 may also generate acid by light.

Specifically, in the Chemical Formula 1, $R^1$ may be methyl, ethyl, propyl, or allyl(prop-2-en-1-yl), and so on.

In the Chemical Formula 1, if $A^1$ is N or P, k becomes 3 and the cation of the Chemical Formula 1 may be ammonium cation or phosphonium cation. Meanwhile, in the Chemical Formula 1, if $A^1$ is S, k becomes 2 and the cation of the Chemical Formula 1 may be sulfonium cation.

In the Chemical Formula 1, $R^2$ may be defined as explained above, and the curable composition according to one embodiment may comprise various initiators that can initiate a cationic polymerization reaction by heat. In the Chemical Formula 1, plural $R^2$ may be identical or different radicals.

Specifically, $R^2$ may be phenyl, naphthyl, benzyl, hydroxyphenyl, acetylphenyl, acetyloxypheny, methylbenzyl or naphthylmethyl, and so on.

The cationic polymerization initiator comprises an anion ionically bonded to the cation of the Chemical Formula 1. The kind of the anion is not specifically limited. As non-limiting examples, the cationic polymerization initiator may comprise an anion selected from the group consisting of $PF_6$, $SbF_6$ and $B(C_6F_5)_4$.

As the cationic polymerization initiator comprising the cation of the Chemical Formula 1, San-Aid SI-B3, SI-B3A, SI-B2A, SI-60L, SI-100L, SI-110L, and so on, manufactured by Sanshin Chemical industry Co., Ltd may be used.

The cationic polymerization initiator may be included in the content of 0.01 to 5 parts by weight, 0.01 to 3 parts by weight, 0.01 to 1 part by weight, or 0.1 to 1 part by weight, based on 100 parts by weight of the curable composition. The cationic polymerization initiator may be used within the above explained range to begin an appropriate cationic polymerization reaction without degradation of a plastic film formed from the curable composition.

The curable composition according to one embodiment may comprise a radically curable compound to provide a plastic film exhibiting high hardness and abrasion resistance of glass level.

The radically curable compound may be a monomer that can be cured by free radical generated from a radical polymerization initiator. Among them, a multifunctional acrylate may be used as the radically curable compound so that it may be combined with the cationically curable compound to provide a plastic film with high hardness and abrasion resistance. The multifunctional acrylate means a compound including two or more acryloyl groups or two or more methacryloyl groups.

Specifically, as the multifunctional acrylate, for example, multifunctional acrylate in which the equivalent weight of acryloyl groups and methacryloyl groups is about 50 to 500 g/eq, about 50 to 400 g/eq, about 50 to 300 g/eq, about 50 to 200 g/eq or about 50 to 150 g/eq, may be used. Such multifunctional acrylate may provide a plastic film with high hardness through thermoforming, with a low possibility of generating cracks at the time of thermoforming.

More specifically, as the multifunctional acrylate, one or more selected from the group consisting of hexanediol diacrylate, hexanediol dimethacrylate, tripropyleneglycol diacrylate, tripropyleneglycol dimethacrylate, ethyleneglycol diacrylate, ethyleneglycol dimethacrylate, trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate may be used.

The radically curable compound may be included in the content of 5 to 60 parts by weight, 5 to 55 parts by weight, 10 to 50 parts by weight, or 15 to 40 parts by weight, based on 100 parts by weight of the curable composition. The curable composition comprising the radically curable compound in the above explained content range exhibits low tackness in a semi-cured state, and thus, is easy to thermoform, can effectively prevent generation of cracks in a plastic film by cure shrinkage at the time of thermoforming or bending of a plastic film to an unwanted direction, and can provide a plastic film exhibiting high hardness and abrasion resistance.

As a radical polymerization initiator for initiating a polymerization reaction of such a radically curable compound, various radical polymerization initiators known in the technical field to which the present invention pertains may be used. Particularly, as the radical polymerization initiator, initiators capable of generating free radical by light may be used. Specifically, as the radical polymerization initiator, 1-hydroxy-cyclohexylphenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, or bis(2,4,6-trimethylbenzoyl)-phenylphosphine oxide, and so on, may be used. And, as currently commercially available products, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and so on, may be used. The above listed initiators may be used alone or two or more kinds thereof may be used in combination.

The radical polymerization initiator may be included in the content of 0.01 to 5 parts by weight, 0.01 to 3 parts by weight, 0.01 to 1.5 parts by weight or 0.1 to 1 part by weight, based on 100 parts by weight of the curable composition. The radical polymerization initiator may be used in the above explained content range to begin an appropriate radical polymerization reaction without degradation of the properties of a plastic film formed from the curable composition.

In the curable composition according to one embodiment, the cationically curable compound and the radically curable compound may be included in the weight ratio of 9:1 to 1:9, 9:1 to 4:6, 9:1 to 5:5 or 8:2 to 6:4. By comprising these compounds at such weight ratios, a plastic film that can be easily thermoformed and has high hardness without generation of curls and cracks at the time of heat curing, can be provided.

The curable composition according to one embodiment may further comprise other additives commonly used in the technical field to which the present invention pertains, besides the above explained cationically curable compound, cation polymerization initiator, radically curable compound and radical polymerization initiator. Such additives may include inorganic particles, an antioxidant, an organic solvent, an UV absorber, a surfactant, a leveling agent, an antifouling agent, and so on.

Specifically, the curable composition may further comprise inorganic particles so as to improve hardness of a plastic film. As such inorganic particles, for example, nanoparticles having a particle diameter of about 100 nm or less, about 10 to about 100 nm, or about 10 to about 50 nm may be used. As non-limiting examples, as the inorganic particles, silica particles, aluminum oxide particles, titanium oxide particles or zinc oxide particles, and so on, may be used. Such inorganic particles may be included in the content of about 80 parts by weight or less, based on 100 parts by weight of the curable composition.

And, the curable composition may further comprise an antioxidant so as to inhibit yellowing of the plastic film obtained from the composition or during polymerization of the composition. Examples of the antioxidant may include a phenol-based antioxidant, an aromatic amine-based antioxidant or a phosphate-based antioxidant, and so on, and specific examples thereof may include 2,6-di(t-butyl)-4-methylphenol or tris(nonylphenyl) phosphate, and so on. Such an antioxidant may be included in the content of about 5 parts by weight or less or about 1 part by weight or less, based on 100 parts by weights of the curable composition.

If the components included in the curable composition are uniformly mixed and the composition has an appropriate viscosity and good coatability, the curable composition may not comprise a solvent. For example, the viscosity of the curable composition may be controlled to about 1,200 cps or less at 25° C., thus exhibiting appropriate flowability and coatibility. If it is difficult to uniformly mix the curable composition or the viscosity of the curable composition is too high, an organic solvent may be further added to the curable composition. Examples of the organic solvent may include alcohol such as methanol, ethanol, isopropylalcohol, butanol; alkoxy alcohol such as 2-methoxyethanol, 2-ethoxyethanol, 1-methoxy-2-propanol; ketone-based solvents such as acetone, methylethylketone, methylisobutylketone, methylpropylketone, cyclohexanone; ether-based solvents such as propylene glycol monopropyl ether, propylene glycol monomethyl ether, ethylene glycol momoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, diethylene glycol-2-ethylhexyl ether; aromatic solvents such as benezene, toluene, xylene, and so on, and the above listed solvents may be used alone or in combination of two or more kinds thereof. The content of the organic solvent may be appropriately controlled within a range that does not degrade the properties of the curable composition.

The curable composition according to one embodiment can provide a plastic film through a photocuring and heat curing process. Specifically, a plastic film of a curved shape as well as a sheet shape can be prepared by coating the curable composition on a substrate and partially photocuring it to obtain a semi-cured product, and thermoforming and heat curing the semi-cured product.

Hereinafter, a method for preparing a plastic film using the curable composition will be explained in detail.

The curable composition may be coated on one side or both sides of a substrate, as necessary. Here, as the substrate, various substrates known in the technical field to which the present invention pertains may be used according to the use of the plastic film.

And, the curable composition may be coated on a substrate through various methods known in the technical field to which the present invention pertains. As non-limiting examples, the curable composition may be coated by bar coating, knife coating, roll coating, blade coating, die coating, micro gravure coating, comma coating, slot die coating, rib coating, or solution casting, and so on.

The curable composition may be coated such that the thickness after completely cured may become about 20 μm or more, about 20 to about 500 μm, about 20 to about 400 μm, about 20 to about 300 μm, about 50 to about 200 μm or about 50 to about 150 μm. Although the existing plastic film used instead of glass was very thickly prepared so as to realize surface hardness and abrasion resistance, and so on, by using the curable composition according to one embodiment, even if a plastic film with a thickness of the above range is prepared, high hardness and excellent abrasion resistance can be realized. However, the coating thickness of the curable composition is not limited to the above explained range. The curable composition according to one embodiment can compensate for the problem of incomplete photocuring even if a thick plastic film is prepared, by preparing a plastic film through heat and light. Thus, a plastic film with excellent mechanical properties regardless of the thickness can be prepared using the curable composition.

If a plastic film to be prepared is a two-dimensional flat film, the coating layer of the curable composition may be cured by coating the curable composition on a substrate, and then, irradiating light or applying heat or irradiating light while applying light.

Meanwhile, if a plastic film to be prepared is a three-dimensional film, a plastic film of a curved shape can be prepared from the curable composition by coating the curable composition on a substrate, irradiating light to semi-cure, fixing it to a desired shape, and then, applying heat.

The two-dimensional flat film may be prepared by the method of preparing a three-dimensional film, or by simplifying the preparation method of a three-dimensional film. Thus, hereinafter, a method for preparing a three-dimensional film will be explained in detail, and an application example for preparing a two-dimensional flat film will be explained briefly.

As explained above, a partially cured (or semi-cured) coating layer may be obtained by coating the curable composition on a substrate to obtain an uncured coating layer, and irradiating light thereto. Here, the intensity and amount of light irradiated to the uncured coating layer may be controlled such that the obtained partially cured coating layer may become a state that can be thermoformed.

Specifically, the intensity and amount of light irradiated to the uncured coating layer may be controlled such that based on the total curable functional groups of the cationically curable compound included in the uncured coating layer, about 20 to 50 mol % of the curable functional groups may be cured, and based on the total curable functional groups of the radically curable compound, about 80 to 100 mol % or about 90 to 100 mol % of the curable functional groups may be cured. The mole number of the cured curable functional groups may be confirmed through infrared spectrometer.

In order to obtain a semi-cured coating layer with such a degree of cure, UV may be irradiated to the uncured coating layer at the intensity of about 100 to about 2,000 mJ/cm$^2$, about 100 to about 1,000 mJ/cm$^2$, about 100 to about 500 mJ/cm$^2$. And, the UV irradiation time may be appropriately controlled according to the thickness and area of the uncured coating layer, and so on. As non-limiting examples, the UV irradiation time may be controlled to about 30 seconds to 15 minutes, or about 1 minute to about 10 minutes. Under these conditions, a coated film that exhibits low tackness and thus can be thermoformed without sticking to a mold or surface deformation, can be obtained. And, a semi-cured coating layer prepared under these conditions has flexibility and can be easily curved to a desired shape, and thus, can be easily molded to a three-dimensional shape without curl or crack.

As a light source that can be used in the light irradiation process, various light sources known in the technical field to which the present invention pertains can be used. As non-limiting examples, a high pressure mercury lamp, a metal halide lamp, a black light fluorescent lamp, and so on, can be used.

In case the curable composition is coated only one side of a substrate to obtain a semi-cured coating layer, the curable composition may be coated again on the other side of the substrate and the above explained process may be repeated once again to form a coating layer semi-cured on both sides of a substrate.

Meanwhile, if a semi-cured coating layer is obtained through the above explained process, the semi-cured coating layer is fixed to a desired shape and heat is applied. Here, if a plastic film to be prepared is of a two-dimensional flat shape, the semi-cured coating layer is placed on a flat place with the thermoforming process being omitted, followed by heating to heat cure. To the contrary, if a plastic film to be prepared is of a three-dimensional shape, a mold capable of realizing a desired shape is prepared, and heat may be applied while the semi-cured coating layer is fixed to a desired shape. Since the semi-cured coating layer is prepared from the above explained curable composition and comprises a cation of the Chemical Formula 1 that generates acid by heat, it may be heat cured at the time of thermoforming. Thus, the existing two-step reaction is conducted at one time, thereby further improving the productivity of a plastic film.

Specifically, the semi-cured coating layer is positioned on a prepared mold, and is fixed to a desired shape. Thereafter, the semi-cured coating layer that is fixed to a desired shape may be placed at a certain temperature for a certain time, thus simultaneously progressing thermoforming and heat curing. Here, the heating temperature and heating time may be appropriately controlled according to the kind and thickness of the substrate, the thickness of the semi-cured coating layer, a shape to be molded, the pressure applied form the mold, and so on.

For example, thermoforming and heat curing may be performed by heating one pair of male and female molds to a certain temperature, and positioning the semi-cured coating layer between the one pair of male and female molds and closely contacting them, And, thermoforming and heat curing may be performed by positioning the semi-cured coating layer on one mold among one pair of male and female molds and applying vacuum or air pressure to closely contact them. However, the thermoforming and heat curing process is not limited thereto, and if a plastic film in which only the edge is curved is to be prepared, a bar, and so on, other than a mold may be used to fix and thermoforming and heat curing may be performed so that the edge of the semi-cured coating layer is fixed to a desired shape.

If heat is applied to the semi-cured coating layer through the thermoforming and heat curing process, acid is generated from the cationic polymerization initiator included in the semi-cured coating layer and the cationically curable compound may be heat cured. Particularly, 3,4,3',4'-diepoxybicyclohexyl or oligomer derived therefrom included in the semi-cured coating layer forms a cured product of a high cross-linking density at a fast speed by a cationic polymerization initiator containing the cation of the Chemical Formula 1 that easily generates acid under thermoforming process conditions. Thus, since the semi-cured coating layer is sufficiently cured during the thermoforming process, a separate heat curing process may be omitted. And, by forming a coating layer of a high cross-linking density, a plastic film of high hardness can be provided.

For example, if the curable composition is coated on a substrate to a thickness of 100 μm after curing, followed by irradiation of UV of 200 mJ/cm$^2$ to photocure and heat curing at a temperature of 100 to 130° C. to form a coating layer, the coating layer may exhibit pencil hardness of 4H or more, 5H or more, or 6H or more under a load of 1.0 kg. The upper limit of the pencil hardness is not specifically limited, and for example, it may be 9H or less. Regarding the details of the measuring method of pencil hardness, the methods described in the examples below may be referred to.

And, the coating layer may exhibit haze of 1% or less or 0.5% or less. The lower limit of haze is not specifically limited, and for example, it may be 0%. Regarding the details of the measuring method of haze, the methods described in the examples below may be referred to.

In order to exhibit pencil hardness and/or haze of the above range, a cured layer of a high cross-linking density should be formed at a fast speed. Thus, it can be confirmed from the pencil hardness and haze properties that the curable composition according to one embodiment realizes sufficiently fast curing speed and high cross-linking density.

In addition, by thermoforming and heat curing the semi-cured coating layer as explained above, a plastic film that not only realizes high transparency and high hardness like glass but also has minimized generation of curl and crack, can be provided.

For example, when a plastic film of a two-dimensional flat shape is prepared from the curable composition according to the above explained preparation method, and then, the plastic film is cut out to a square shape with the width and length of 10 cm and placed at the bottom, the maximum value of a distance at which the edge or one side is spaced apart from the bottom may be 3 cm or less, 2.5 cm or less, or 2.0 cm or less.

And, when the plastic film of a two-dimensional flat shape is exposed to a temperature of 50 to 90° C. and humidity of 80 to 90% for 70 to 100 hours, and then, placed at a flat bottom, the maximum value of a distance at which the edge or one side of the plastic film is spaced apart from the bottom may be about 1.0 mm or less, about 0.6 mm or less, or about 0.3 mm or less.

For another example, in case the curable composition is prepared into a plastic film of a curved three-dimensional shape according to the above explained preparation method, curved parts with a wide range of radii of curvature can be formed while minimizing generation of curl or crack. Specifically, in case a plastic film in which two facing edges among four edges are curved or four edges are all curved is prepared, each edge may have a curvature radius of 2.5 to 15. And, in case a plastic film of a generally curved shape is prepared from the curable composition, the radius of curvature of the plastic film of a curved shape may be 2.5 to 900.

Meanwhile, the plastic film prepared through thermoforming and heat curing may be aged at room temperature for about 24 hours or more for shape stabilization.

A plastic film prepared from the curable composition according to one embodiment according to the above explained method may exhibit high hardness, impact resistance, flexibility, scratch resistance, high transparency, durability, light resistance, high transmittance, and so on, and thus, can be usefully used in various fields. Particularly, since the plastic film not only exhibits high hardness and abrasion resistance of glass level but also is not easily broken, it is expected to be variously applied as new material that can be used instead of glass.

Hereinafter, the actions and effects of the present invention will be specifically explained through specific examples. However, these are presented only as the illustration of the invention, and the scope of the invention is not limited thereto.

Example 1: Preparation of a Curable Composition and a Plastic Film Using the Same 80 g of 3,4,3',4'-diepoxybicyclohexyl as a cationically curable compound, 0.5 g of SI-100L (manufactured by sanshin), 20 g of a mixture of pentaerythritol triacrylate and pentaerythritol tetraacrylate as radically curable compounds, and 1 g of Irgacure 184 (manufactured by BASF) were mixed to prepare a curable composition.

The curable composition was coated on a polycarbonate substrate with a width of 15 cm, a length of 20 cm and a thickness of 500 μm. And, on the obtained coated film, UV of about 200 mJ/cm$^2$ was irradiated using a metal halide lamp to obtain a semi-cured coating layer with a thickness of 100 μm.

Subsequently, the semi-cured coating layer was positioned between male and female molds that bend both facing edges with 5R, 90 degree curve, and was left at a temperature of 100 to 130° C. for 2 minutes. Thereafter, the male and female molds were laminated with a pressure of 700 to 800 kgf/cm$^2$. While the laminating was completed, it was maintained for 3 minutes to conduct a heat curing and thermoforming process. As the result, a plastic film having a three-dimensional structure in which both facing edges are 5R, 90 degree curved, was prepared.

Example 2: Preparation of a Curable Composition and a Plastic Film Using the Same A curable composition was prepared by the same method as Example 1, except using 60 g of 3,4,3',4'-diepoxybicyclohexyl and 20 g of celloxide 2021P (manufactured by Daicel) as cationically curable compounds in Example 1, and a plastic film was prepared using the same.

Example 3: Preparation of a Curable Composition and a Plastic Film Using the Same A curable composition was prepared by the same method as Example 1, except using 40 g of 3,4,3',4'-diepoxybicyclohexyl and 20 g of celloxide 2021P (manufactured by Daicel) as cationically curable compounds, and using 40 g of a mixture of pentaerythritol triacrylate and pentaerythritol tetraacrylate as radically curable compounds in Example 1, and a plastic film was prepared using the same.

Comparative Example 1: Preparation of a Curable Composition and a Plastic Film Using the Same A curable composition was prepared by the same method as Example 1, except using 4,4'-bis[di(β-hydroxyethoxy)phenylsulfonio]phenylsulfide bishexafluoroantimonate instead of SI-100L (manufactured by sanshin) in Example 1.

The curable composition was coated on a polycarbonate substrate with a width of 15 cm, a length of 20 cm and a thickness of 500 μm. And, on the obtained coated film, UV of about 200 mJ/cm$^2$ was irradiated using a metal halide lamp to obtain a semi-cured coating layer with a thickness of 100 μm.

Subsequently, the semi-cured coating layer was positioned between male and female molds that bend both facing edges with 5R, 90 degree curve, and was left at a temperature of 100 to 130° C. for 2 minutes. Thereafter, the male and female molds were laminated with a pressure of 700 to 800 kgf/cm$^2$. While the laminating was completed, it was maintained for 3 minutes to conduct a thermoforming process. At the curved part of the obtained plastic film, cracks were detected.

Comparative Example 2: Preparation of a Curable Composition and a Plastic Film Using the Same A curable composition was prepared by the same method as Example 1, except that the content of 3,4,3',4'-diepoxybicyclohexyl was reduced from 80 g to 40 g, and bis(2-ethylhexyl)-4,5-epoxyhexahydrophthalate was used as much as the reduced content of 3,4,3',4'-diepoxybicyclohexyl, and a plastic film was prepared using the same.

Experimental Example: Evaluation of Plastic Film (1) Pencil Hardness

The pencil hardnesses of the plastic films prepared in Examples and Comparative Examples were measured according to ASTM D3363-74. Specifically, the surface of the plastic film was drawn one time under a load of 1.0 kgf using a pencil hardness tester. For each plastic film, the highest hardness without flaw was confirmed, and this test was repeated 5 times to calculate the mean value.

(2) Thermoformability

After thermoforming, the flat part of the plastic film was compared with the surface of a mold to observe whether or not deformation occurred, and it was observed whether or not cracks were formed at the curved part of the plastic film. As the result of observation, if there is no deformation on the flat part of the plastic film and there is no crack at the curved part, it was indicated as 'excellent' in the following Table 1, and if there is a deformation on the flat part of the plastic film or there is a crack at the curved part, indicated as 'faulty' in the following Table 1.

(3) Tackness

After semi-cured and before thermoformed, peel strength of the semi-cured coating layer to the polycarbonate substrate was measured using a texture analyzer (Stable Micro System, UK) under conditions of 50 mm/min peel speed and 90° peel angle.

As the result, if the peel strength is less than 0.1N/2 cm, it was indicated as 'very excellent', if the peel strength is 0.1N/2 cm or more and less than 0.5N/2 cm, indicated as 'excellent', if the peel strength is 0.5N/2 cm or more and less than 1.0N/2 cm, indicated as 'good', and if the peel strength is 1.0N/2 cm or more, indicated as 'faulty'.

(4) Light Resistance

The plastic films prepared in Examples and Comparative Examples were exposed to UV of UVB wavelength region for 72 hours or more, and then, a difference in color b* before and after exposure to UV was measured.

(5) Transmittance and Haze

Transmittance and haze were measured using a spectrophotometer (apparatus name: COH-400).

The results of property measurement are shown in the following Table 1.

ize high hardness by the fast curing speed. It is also confirmed that the curable compositions used in Examples 1 to 3 provide plastic films of a three-dimensional shape without generation of cracks or curls, due to the low tackness and excellent thermoformability in the semi-cured state.

To the contrary, the curable composition used in Comparative Example 2 had a low curing speed and failed to form a coating layer of high cross-linking density, and thus, the plastic film prepared according to Comparative Example 2 exhibited low hardness and high haze. And, although Comparative Example 1 wherein a cationic photopolymerization initiator generating acid by light was used provided a plastic film with high hardness and low haze, cracks were detected at the curved part of the plastic film. Thus, it is confirmed that the curable composition of Comparative Example 1 cannot provide a plastic film of a three-dimensional shape.

The invention claimed is:

1. A curable composition, comprising:
a cationically curable compound;
a radically curable compound comprising a multifunctional acrylate that includes one or more acrylates selected from the group consisting of trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate;
a cationic polymerization initiator comprising a cation of Chemical Formula 1:

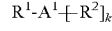
$$R^1\text{-}A^1\text{-}\!\!-\!\!\!\!-\!\!\!\!\!+\!\!R^2]_k \qquad \text{[Chemical Formula 1]}$$

wherein:
$A^1$ is N, P or S,
$R^1$ is a C1-20 alkyl or a C2-20 alkenyl radical,
$R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—, and
k is 2 or 3; and
a radical polymerization initiator comprising 1-hydroxycyclohexylphenyl ketone, 2-hydroxy-2-methyl-1-phe-

TABLE 1

|  | Example 1 | Example 2 | Example 3 | Comparative Example 1 | Comparative Example 2 |
| --- | --- | --- | --- | --- | --- |
| Pencil hardness | 6H | 6H | 5H | 5H | H |
| Tackness | Very excellent | Very excellent | Very excellent | Very excellent | Good |
| Thermoformability | Excellent | Excellent | Excellent | Faulty | Excellent |
| Light resistance | 1.8 | 2.1 | 1.6 | 2.1 | 1.5 |
| Transmittance [%] | 91.50 | 91.5 | 91.67 | 91.12 | 92.40 |
| Haze [%] | 0.37 | 0.37 | 0.42 | 0.38 | 1.3 |

Referring to Table 1, the plastic films prepared according to Examples 1 to 3 exhibited not only high hardness but also low haze. Thus, it is confirmed that the curable composition according to one embodiment of the present invention is sufficiently cured during the thermoforming process to realnyl-1-propanone, 2-hydroxy-1-[4-(2-hydroxyethoxy) phenyl]-2-methyl-1-propanone, methylbenzoylformate, diphenyl(2,4,6-trimethylbenzoyl)-phosphine oxide, bis(2,4,6-trimethylbenzoyl)-phenylphosphine oxide or a combination thereof;

wherein 90 wt % to 100 wt % of the total weight of the cationically curable compound is 3,4,3',4'-diepoxybicyclohexyl, wherein the cationically curable compound and the radically curable compound are included at a weight ratio of from 8:2 to 6:4, and wherein the curable composition, when coated on a substrate to a thickness of 100 μm, after photocuring by irradiating with UV light of 200 mJ/cm$^2$, and thermally curing at a temperature of 100 to 130° C., has a pencil hardness of 5H or more under a 1.0 kg load.

2. The curable composition of claim 1, wherein $R^1$ in the Chemical Formula 1 is methyl, ethyl, propyl or allyl.

3. The curable composition of claim 1, wherein $R^2$ in the Chemical Formula 1 is phenyl, naphthyl, benzyl, hydroxyphenyl, acetylphenyl, acetyloxyphenyl, methylbenzyl, or naphthyl methyl.

4. The curable composition of claim 1, wherein the cationic polymerization initiator comprises an anion selected from the group consisting of $PF_6$, $SbF_6$ and $B(C_6F_5)_4$.

5. The curable composition of claim 1, wherein the cationic polymerization initiator is included in an amount of 0.01 to 5 parts by weight, based on 100 parts by weight of the curable composition.

6. The curable composition of claim 1, wherein the radical polymerization initiator is included in an amount of 0.01 to 5 parts by weight, based on 100 parts by weight of the curable composition.

7. The curable composition of claim 1, further comprising one or more additives selected from the group consisting of inorganic particles, an antioxidant, an organic solvent, a UV absorber, a surfactant, a leveling agent, and an antifouling agent.

8. The curable composition of claim 1, wherein when coated on a substrate to a thickness of 100 μm after photocuring by irradiating with UV light of 200 mJ/cm$^2$, and thermally curing at a temperature of 100 to 130° C., has a haze of 1% or less.

\* \* \* \* \*